United States Patent
O'Toole et al.

(10) Patent No.: US 9,145,159 B1
(45) Date of Patent: Sep. 29, 2015

(54) LIGHTWEIGHT TOOL DELIVERY SYSTEM

(71) Applicants: Aaron O'Toole, Indian Head, MD (US); William E Transue, Indian Head, MD (US); James F Murphy, Fort Washington, MD (US); Bonnie J Richardson, Bryans Road, MD (US)

(72) Inventors: Aaron O'Toole, Indian Head, MD (US); William E Transue, Indian Head, MD (US); James F Murphy, Fort Washington, MD (US); Bonnie J Richardson, Bryans Road, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/121,428

(22) Filed: Sep. 5, 2014

(51) Int. Cl.
*B62B 15/00* (2006.01)

(52) U.S. Cl.
CPC ..................... *B62B 15/007* (2013.01)

(58) Field of Classification Search
CPC ...... B62B 15/00; B62B 15/007; B62B 17/06; B62B 17/061
USPC ............... 280/18, 19, 24, 28.12, 28.13, 28.17
See application file for complete search history.

(56) References Cited

U.S. PATENT DOCUMENTS

| | | | | |
|---|---|---|---|---|
| 3,937,482 A | * | 2/1976 | Johnson | 280/18 |
| 3,938,819 A | * | 2/1976 | Martin | 280/19 |
| 4,262,919 A | | 4/1981 | Krent | |
| 4,291,891 A | * | 9/1981 | Blanchette | 280/9 |
| 4,968,046 A | * | 11/1990 | O'Connell et al. | 280/12.11 |
| 5,119,752 A | | 6/1992 | Doherty | |
| 5,263,745 A | | 11/1993 | Storey | |
| 5,513,868 A | | 5/1996 | Barr | |
| 5,645,289 A | | 7/1997 | Harmon | |
| 5,653,455 A | * | 8/1997 | Richards | 280/19 |
| 6,193,003 B1 | | 2/2001 | Dempster | |
| 6,364,324 B1 | | 4/2002 | Buchanan | |
| 6,641,446 B1 | | 11/2003 | Bentley | |
| 6,698,540 B1 | | 3/2004 | Decker, Jr. | |
| 6,725,959 B1 | | 4/2004 | Shea et al. | |
| 7,032,906 B1 | * | 4/2006 | Wright | 280/24 |
| 7,422,220 B2 | | 9/2008 | Walkingshaw et al. | |
| 7,506,606 B2 | | 3/2009 | Murphy et al. | |
| 7,547,024 B1 | | 6/2009 | Dell | |
| 2005/0236786 A1 | * | 10/2005 | Bryan | 280/28.12 |
| 2006/0061050 A1 | | 3/2006 | Wolf et al. | |
| 2006/0255552 A1 | * | 11/2006 | Wojnowski et al. | 280/18 |
| 2007/0035095 A1 | | 2/2007 | Mehtonen | |
| 2007/0138752 A1 | * | 6/2007 | Kress et al. | 280/19 |
| 2013/0277927 A1 | * | 10/2013 | Harvey | 280/19 |

OTHER PUBLICATIONS

Med Sled Emergency Evacuation Sled www.medsled.com Cabela's Utility Sled http://www.cabelas.com/shelters-sleds-cabelas-utility-sled.shtml.

* cited by examiner

*Primary Examiner* — John Walters
(74) *Attorney, Agent, or Firm* — Fredric J. Zimmerman (57) ABSTRACT

A tool sled having a body with a concave top surface and a convex bottom surface is provided and includes a flat plate and a handle. The bottom surface is symmetric about a transverse axis and passes through the body in a direction perpendicular to a direction of movement of the sled. A flat plate in contact with the top surface along two contact lines runs across the concave surface where each contact line is parallel to the transverse axis. A handle attached to the body extends upwardly from the top surface and outwardly from the body along a longitudinal axis parallel to the direction of movement of the sled.

19 Claims, 5 Drawing Sheets

LIGHTWEIGHT TOOL DELIVERY SYSTEM

STATEMENT OF GOVERNMENT INTEREST

The invention described herein may be manufactured and used by or for the Government of the United States of America for Governmental purposes without the payment of any royalties thereon or therefore.

BACKGROUND OF INVENTION

1) Field of the Invention

The present invention is directed to drag sleds.

2) Description of Prior Art

Sleds transport items across surfaces while being pushed or pulled by a human or a motorized vehicle. The sleds are configured to carry a variety of tools and to accommodate the surface over which the sleds traverse. Drag sleds are pushed and pulled over the ground, over snow and ice or through water. The ground may be uneven and may include unanticipated obstacles such as ravines and rocks. In more urban environments, these obstacles include curbs, ramps and steps. Applications of, sleds in tactical environments must also accommodate craters and debris.

A drag sled, therefore, should be able to accommodate unknown terrain and obstacles, passing over or surmounting those obstacles. As the sled may need to be extradited from a position, the sled should be shaped to overcome the obstacles in both a forward and reverse direction. The drag sled should stand up to use over harsh terrains and in tactical environments.

SUMMARY OF THE INVENTION

Exemplary embodiments of systems and methods in accordance with the present invention provide a lightweight tool delivery system. The tool delivery system includes a tool sled, such as a drag sled, in combinations with a propulsion device such as a tactical robot. The tool sled includes a body having a concave top surface and a convex bottom surface. The bottom surface is symmetric about a transverse axis passing through the body in a direction perpendicular to the direction of movement of the sled in either a forward for reverse direction. In an exemplary embodiment, the bottom surface is also symmetric about a longitudinal axis of the sled that is parallel to the direction of movement of the sled. In an exemplary embodiment, the tool sled body includes a leading edge, a trailing edge opposite the leading edge and a pair of opposing side edges extending from the leading edge to the trailing edge.

The tool sled includes a flat plate that in contact with the top surface along two distinct contact lines running across the concave surface. Each contact line is parallel to the transverse axis. A rigid handle is attached to the body, for example at the leading edge of the body, and extends upwardly from the top surface and outwardly from the body along the longitudinal axis. Suitable materials for the body, flat plate, and handle include electrically conductive materials, but are not limited to, aluminum, titanium, tin, steel, metallic alloys and combinations thereof.

In an exemplary embodiment, the tool sled body includes a plurality of distinct segments and a plurality of joints. Each joint is disposed between adjacent pairs of segments and extends parallel to the transverse axis. Therefore, adjacent pairs of segments pivot with respect to each other about a given joint. Each joint can be configured as a scored line, a gap between adjacent pairs of segments or a hinged connection containing, for example, at least one hinge.

In order to define and to maintain the desired concave top surface and convex bottom surface, the tool sled includes at least one rigid curved stay attached to the body and extends along the body parallel to the longitudinal axis. The plurality of distinct segments pivot about the plurality of joints to conform to the curvature of the rigid curved stay. In an exemplary embodiment, the rigid curved stay is attached to the concave top surface such that the curvature of the rigid curved stay defines the shape of the concave top surface and the convex bottom surface. In an exemplary embodiment, the rigid curved stay is arranged as a pair of identical rigid curved stays. Each rigid curved stay runs along one of the opposing side edges of the tool sled body.

In an exemplary embodiment, the tool sled body includes a pair of leading corners. Each leading corner defines a point of intersection of one of the opposing side edges and the leading edge of the body. The leading edge extends outward in the direction of travel of the sled from a leading corner line that connects the pair of leading corners and, in an exemplary, is parallel to the transverse axis. In another embodiment, the body includes a pair of trailing corners. Each trailing corner defines a point of intersection of one of the opposing side edges and the trailing edge of the body. In an exemplary embodiment, the leading corner line is parallel to a trailing corner line that connects the pair of trailing corners. The leading corner line and the trailing corner line are disposed in a common plane. In an exemplary embodiment, the flat plate lies in a flat plate plane parallel to the common plane. The leading edge of the body extends upward out of this common plane a predefined distance. This predefined distance is generally sufficient to locate the rigid handle a distance of at least 6 inches above a support surface in contact with the convex bottom surface of the tool sled and over which the tool sled passes.

In an exemplary embodiment, each rigid curved stay includes an upper edge disposed in the common plane and extends from the upper edge to the concave top surface along an entire length of one of the opposing side edges. In an exemplary embodiment, the flat plate is disposed on the concave upper surface of the tool sled and includes two distinct contact lines, a first contact line and a second contact line. The first contact line includes at least one hinge in contact with the flat plate and the concave top surface and is configured to facilitate movement of the flat plate from contact with the concave top surface along the second contact line. In an exemplary embodiment, the first contact line includes two separate hinges spaced from each other along the first contact line, and the flat plate has a notch disposed between the two separate hinges and extending into the flat plate from the first contact line. This notch allows access to a void disposed between the flat plate and the concave top surface.

In an exemplary embodiment, the tool sled includes at least one sled runner attached to the convex bottom surface and extending across at least one of the plurality of distinct segments. In an exemplary, the tool sled includes a plurality of sled runners. Each sled runner extends across a plurality of the distinct segments parallel to the longitudinal axis.

Exemplary embodiments in accordance with the present invention are also directed to a system for transporting tools that includes a tool sled in combination with the propulsion mechanism. The tool sled has a body with a concave top surface and a convex bottom surface. The bottom surface is symmetric about a transverse axis passing through the body in a direction perpendicular to a direction of movement of the sled. A flat plate is provided in contact with the top surface along two distinct contact lines running across the concave surface. Each contact line is parallel to the transverse axis. A rigid handle is attached to the body and extends upwardly from the top surface and outwardly from the body along a longitudinal axis parallel to the direction of movement of the sled. The propulsion mechanism is in contact with the handle.

Suitable propulsion mechanisms include, but are not limited to, an unmanned self-propelled vehicle, a motorized vehicle, a manned vehicle, a robot, a robotic vehicle, an automobile, a motorcycle, a bicycle and a tractor.

BRIEF DESCRIPTION OF THE DRAWINGS

It will be understood that many additional changes in details, materials, steps, and arrangements of parts which have been described herein and illustrated in order to explain the nature of the invention, may be made by those skilled in the art within the principle and scope of the invention as expressed in the appended claims.

DETAILED DESCRIPTION OF THE INVENTION

In the description which follows, any reference to either direction or orientation is intended primarily and solely for purposes of illustration and is not intended in any way as a limitation on the scope of the present invention. Also the particular embodiments described herein, although being exemplary, are not to be considered as limiting of the present invention.

Referring to FIGS. 1-5, an exemplary embodiment, of a tool sled 100 includes a body 102 having a concave top surface 126 and a convex bottom surface 128 opposite the concave top surface. The concave top surface forms the interior of the sled in which tools or other items to be transported are held. The convex bottom surface 128 faces and is at least partially in contact with the surface over which the tool sled passes. Suitable surface include, but are not limited to, the ground, streets, floors, steps and sidewalks.

The shape of the convex bottom surface is selected based upon the surface over which the tool sled passes, anticipated obstacles in the path of the tool sled and the direction of travel of the tool sled, i.e., forward, reverse or sideways. In an exemplary embodiment, the curvature, shape and symmetries of the concave top surface are identical to the convex bottom surface. Alternatively, the curvature, shape and symmetries of the concave top surface are different than the convex bottom surface. In an exemplary embodiment, at least a portion of the body 102 is symmetric about a transverse axis 122 passing through the body 102 perpendicular to a direction of forward movement of the sled as indicated by arrow A. This configuration provides an upwardly sloping front and rear of the sled that facilitates forward and backwards movement, i.e., in the direction of arrow A and in a direction opposite of arrow A, of the tool sled across a wide range of surfaces and obstacles. In an exemplary embodiment, the tool sled 100 is also symmetric about a longitudinal axis 124 passing through the tool sled perpendicular to the transverse axis 122 and parallel to the direction of movement of the tool sled.

Figure 1:
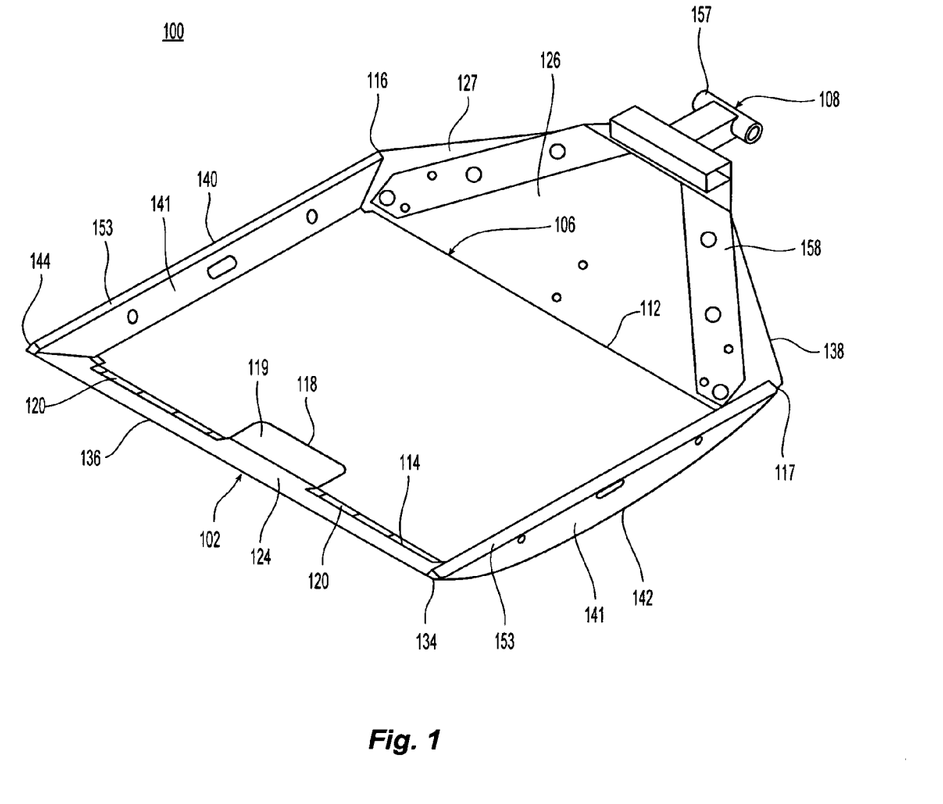
FIG. 1 is a top perspective view from the rear of an embodiment of a tool sled in accordance with the present invention.
Figure 2:
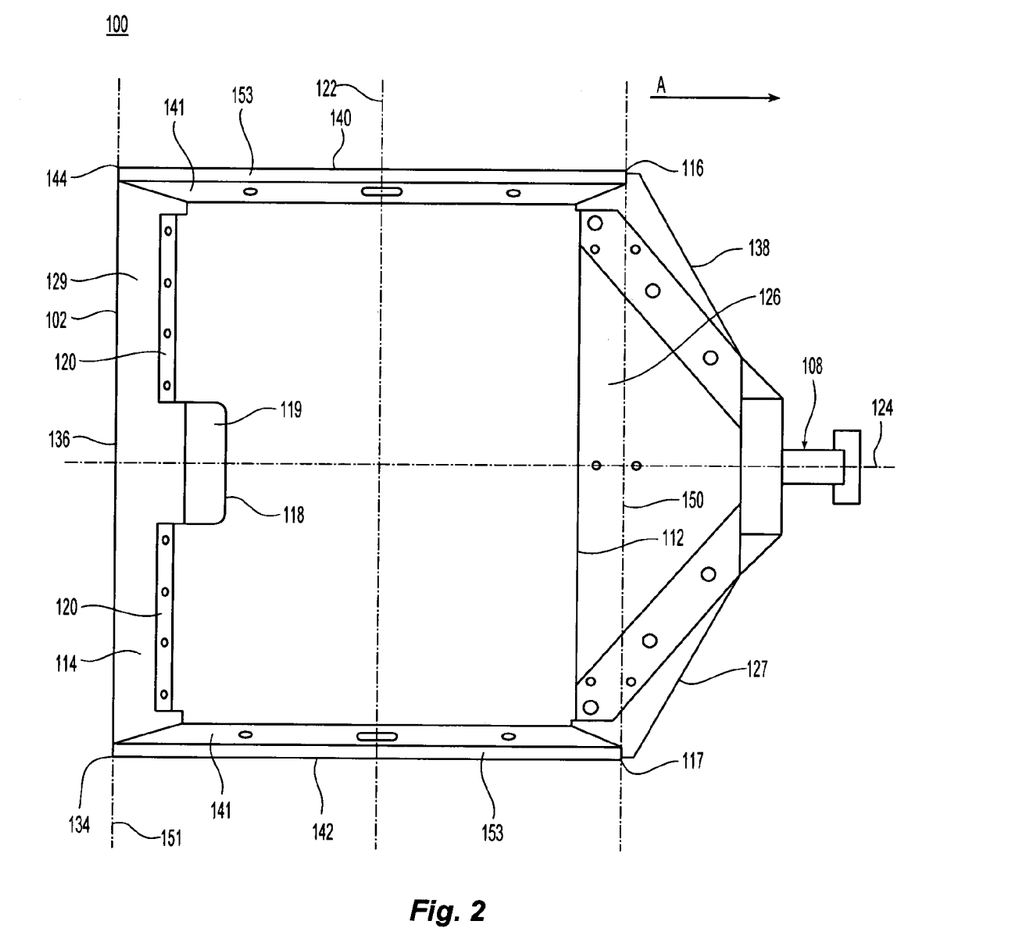
FIG. 2 is a top plan view of the tool sled of FIG. 1.
Figure 3:
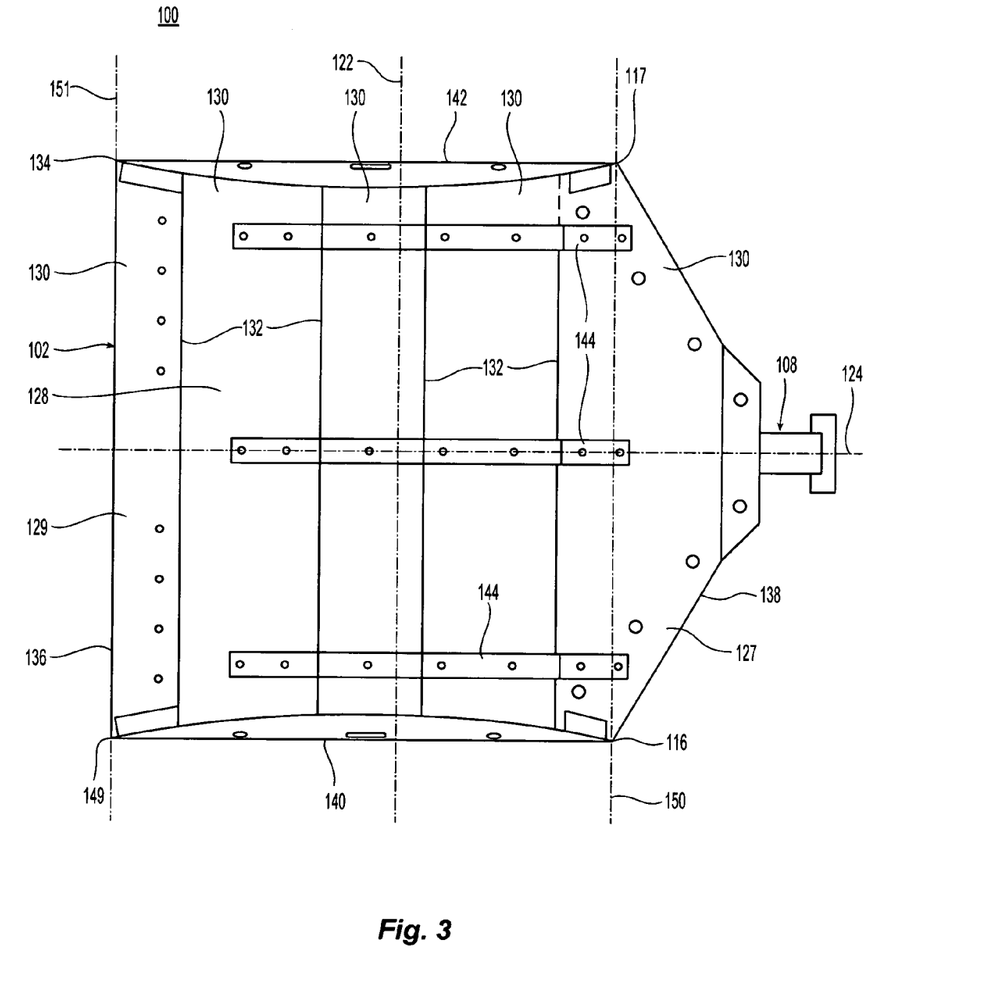
FIG. 3 is a bottom plan view of the tool sled of FIG. 1.

As shown in FIG. 3, the body 102 includes a plurality of distinct segments 130 joined by and meeting along a plurality of joints 132. Each joint is located between adjacent segments and extends parallel to the transverse axis 122. The joints allow adjacent pairs of segments to move with respect to each other about the given joint, i.e., by rotating with respect to each other about the joints. Suitable arrangements for the joints 132 include, but are not limited to, scored lines, gaps between segments or one or more hinges. The number of segments varies as desired, and the segments include a first or front leading segment 127 and a last or back trailing segment 129. The body 102 includes a leading edge 138, which is part of the first segment, a trailing edge 136 opposite the leading edge, which is part of the last segment, and a pair of opposing side edges 140, 142 that extend from the leading edge to the trailing edge.

Figure 4:
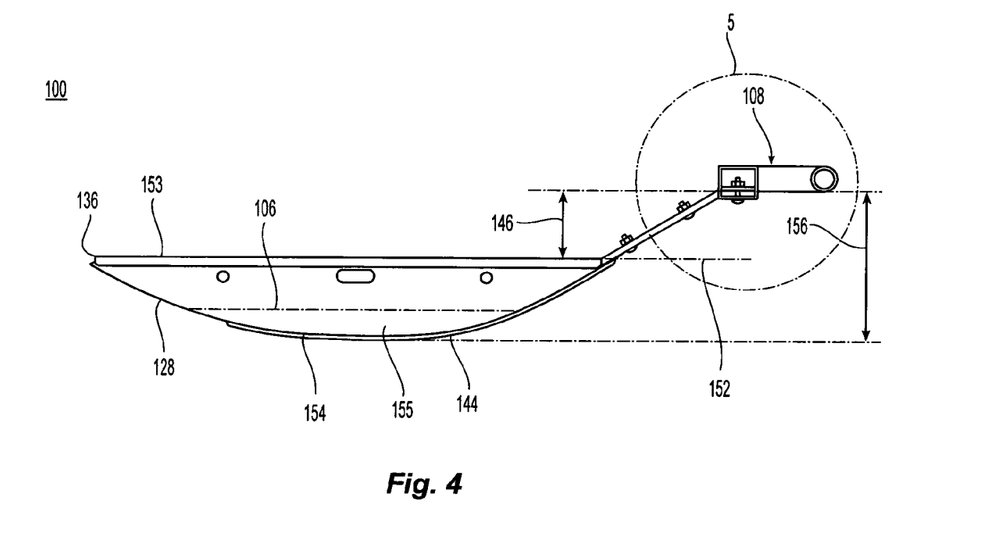
FIG. 4 is an elevation view from one side of the tool sled of FIG. 1.
Figure 5:
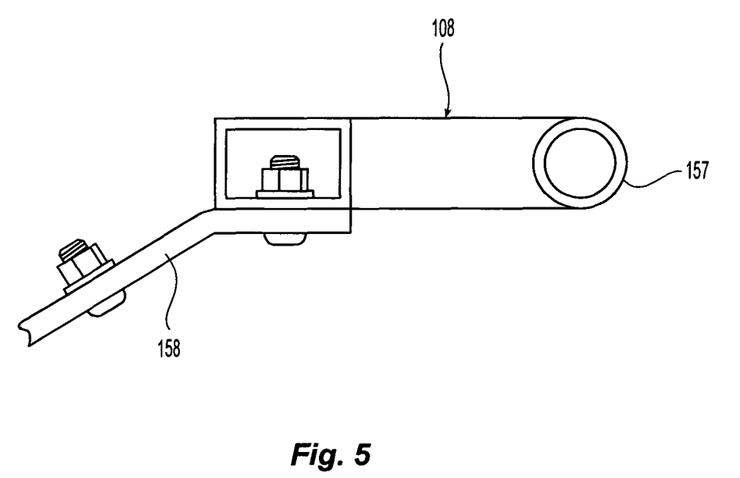
FIG. 5 is a view of section 5 of FIG. 4.

The body 102 includes a pair of leading corners 116, 117. Each leading corner defines a point of intersection of one of the opposing side edges 140, 142 and the leading edge 138. The leading edge extends outward in the direction of movement, arrow A, of the sled from a leading corner line 150 connecting the pair of leading corners 116, 117. The leading corner line passes through the first segment. The body also includes a pair of trailing corners 134, 144. Each trailing corner defines a point of intersection of one of the opposing side edges 140, 142 and the trailing edge 136. The leading corner line 150 connecting the two leading corners 116, 117 is parallel to a trailing corner line 151 connecting the pair of trailing corners 134, 144. The leading corner line and the trailing corner line are disposed in a common plane 152 (FIG. 4). The leading edge in addition to extending outward from the leading corner line, extends upward out of the common plane by a predefined distance 146. This predefined distance is selected based on the terrain over which the sled passes and any anticipated obstacles.

The sled includes at least one rigid stay 141 attached to the upper surface of the body of the tool sled body and running parallel to the longitudinal axis 124. In an exemplary embodiment, the sled includes a pair or rigid stays, one each extending along one of the opposing edges of the body. Each rigid curved stay includes an upper edge 153 disposed in the common plane 152 and extends from the upper edge to the concave top surface along an entire length of one of the opposing side edges. This configuration defines a curved lower edge 154 of each rigid stay. The shape of the upper concave surface and the bottom convex surface of the tool sled body is determined by the curvature of the rigid curved stay and, in particular, the curved lower edge 154. The segments move with respect to each other about the joints and conform to the curvature of the rigid curved stay. Therefore, the rigid stay defines and maintains the desired curvature of the body. By selecting the curvature of the curved stays, the curvature of the sled body is defined. In addition, multiple curved stays may be used having varying curvatures. The number of segments may also be changed, i.e., increased, to facilitate a more form fitting alignment between the stays and the body and to accommodate a desired type of curvature. Suitable materials for the flat plate (tray) 106 are metallic materials, such as, aluminum, titanium, tin, steel, metallic alloys and combinations thereof, in order to minimize electrical isolation of cargo from the ground. Accordingly, the use of metallic materials, that is, metal, helps to prevent the cargo from building up a static electricity charge and minimizes the triboelectric effects associated with many non-conductive materials, such as, plastic.

The sled includes a flat plate 106 in contact with the upper concave surface along two distinct contact lines 112, 114 on the upper concave surface. The two distinct contact lines include a first contact 114 and a second contact line 112. In an exemplary embodiment, the first and second contact lines are parallel to each other and parallel to the transverse axis 122. In an exemplary embodiment, the first contact line 114 includes at least one hinge 120 in contact with the flat plate and the concave top surface. This hinge is configured to facilitate movement of the flat plate 106 from contact with the concave top surface along the second contact line 112, i.e., the flat plate pivots about the hinge to raise the flat plate up from contact with the upper concave surface along the second contact line 112. Suitable materials for the flat plate (tray) 106 are metallic materials, such as, aluminum, titanium, tin, steel, metallic alloys and combinations thereof, in order to minimize electrical isolation of cargo and prevent the cargo from building up a static electricity charge.

In an exemplary embodiment, the first contact line includes two separate hinges 120 spaced from each other along the first contact line 114. In this embodiment, flat plate 106 includes a notch 118 disposed between the two separate hinges 120 and extending into the flat plate 106 from the first contact line 114. The notch 118 defines a passage 119 and allows access to a void 155 (FIG. 4) disposed between the flat plate and the concave top surface. The void may enclose any number of items such as tools, cargo, people, electronics, artillery, hardware and combinations thereof. The passage permits access by cords or ropes. Therefore, the flat plate is an access hatch or moveable lid for the storage void.

In an exemplary embodiment, the common plane 152 is parallel to the support surface that is in contact with the convex bottom surface of the tool sled, i.e., the surface over which the tool sled is passing, and to the flat plate 106 or a plane in which the flat plate is disposed. Thus the flat plate 106 resides between the common plane and the support surface.

The sled includes at least one rigid handle 108. The handle 108 is attached to the body and extends upwardly from the top surface 126 and outwardly from the body 102 along the longitudinal axis 124 parallel to the direction of movement 124 of the sled, arrow A. The handle, in an exemplary embodiment, is attached to the first segment 127 and extends from the center of leading edge 138. The handle is located a predefined distance 146 above the common plane 152. This predefined distance is selected to be sufficient to locate the rigid handle 108 a desired overall distance 156 above a support surface that is in contact with the convex bottom surface 128 of the tool sled 100. The predefined distance and overall distance are determined by a number of variables including and not limited to a specific clearance requirement for attachment to a propulsion mechanism or by the size of obstacles along the surface over which the tool sled is expected to encounter during transport. In an exemplary embodiment, the predefined distance or the overall distance is about 6 inches.

The handle 108 includes a gripping portion 157 and an attachment or structural portion 158. The gripping portion 157 is arranged for gripping by a user or for attachment to a propulsion mechanism used to propel or move the sled. In an exemplary embodiment, the gripping portion 157 is arranged as a cylindrical tube or handle extending parallel to the transverse axis. The attached portion 158 is in contact with the gripping portion and the first segment of the body. The attachment portion 158 includes the structural members, gussets, frame members and fasteners required for attachment of the handle to the body, transfer of the pulling and pushing forces to the body of the sled and reinforcement of the first segment.

The sled includes at least one sled runner 144, and, in an exemplary embodiment, a plurality of sled runners, attached to the convex bottom surface and extending across at least one single segment or a plurality of distinct segments parallel to the longitudinal axis. When passing across multiple segments, the sled runners 144 span the joints between the segments. Therefore, the runners may be segmented, to correspond to the segments in the sled body. Suitable methods for attachment include, but are not limited to, fasteners and welds. The sled runners improve traction and facilitate movement of the sled over specific surfaces such as snow, dirt and gravel.

Suitable materials for the body, flat plate and handle include, but are not limited to, lightweight materials, including but not limited to aluminum, titanium, tin, steel, metallic alloys, and combinations thereof. Such lightweight materials reduce the force required to propel the tool sled across surfaces.

The present invention is also directed to a system for transporting tools that includes a tool sled as described herein in combination with a propulsion mechanism that transports the tool sled over a given support surface in either a forward, arrow A, or reverse direction. In an exemplary embodiment, the propulsion mechanism is in contact with the handle 108. Suitable propulsion mechanisms include, but are not limited to, an unmanned self-propelled vehicle, a motorized vehicle, a manned vehicle, a robot, a robotic vehicle, an automobile, a motorcycle, a bicycle and a tractor. In an exemplary embodiment, the propulsion mechanism is a tactical robot.

It will be understood that many additional changes in details, materials, steps, and arrangements of parts which have been described herein and illustrated in order to explain the nature of the invention, may be made by those skilled in the art within the principle and scope of the invention as expressed in the appended claims.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:
1. A tool sled comprising:
   a body comprising a concave top surface and a convex bottom surface,
      wherein at least a portion of the convex bottom surface is symmetric about a transverse axis, which passes through the body in a direction perpendicular to a direction of movement of the tool sled;
   a flat plate contacting with the concave top surface along two distinct contact lines running across the concave top surface, each of the distinct contact line is parallel to the transverse axis; and
   a rigid handle being attached to the body,
      wherein the rigid handle extends upwardly from the concave top surface and outwardly from the body along a longitudinal axis parallel to the direction of movement of the tool sled,
   wherein the twos distinct contact lines comprise a first contact line and a second contact line, wherein the first contact line comprises at least one hinge in contact with the flat plate and the concave top surface, and wherein the first contact line is configured to facilitate movement of the flat plate from contact with the concave top surface along the second contact line.
2. The tool sled of claim 1, wherein the bottom surface is symmetric about the longitudinal axis.

3. The tool sled of claim 1, wherein at least one of the body, flat plate, and handle is comprised of at least one of aluminum, titanium, tin, steel, and metallic alloys.

4. The tool sled of claim 1, wherein the body further comprises a plurality of distinct segments and a plurality of joints, wherein each of the plurality of joints is disposed between adjacent pairs of the plurality of distinct segments and extends parallel to the transverse axis, and wherein adjacent pairs of the plurality of distinct segments pivot with respect to each other about a given joint.

5. The tool sled of claim 4, wherein each of the plurality of joints comprises one of a scored line, a gap between adjacent pairs of the plurality of segments, and at least one hinge.

6. The tool sled of claim 4, further comprising at least one rigid curved stay being attached to the body and extending along the body parallel to the longitudinal axis, wherein the plurality of distinct segments pivot about the plurality of joints to conform to a curvature of the rigid curved stay.

7. The tool sled of claim 4, further comprising at least one rigid curved stay being attached to the body and extending along the body parallel to the longitudinal axis, wherein the plurality of distinct segments pivot about the plurality of joints to conform to a curvature of the rigid curved stay, and wherein the rigid curved stay is attached to the concave top surface and the curvature of the rigid curved stay defines a shape of the concave top surface and the convex bottom surface.

8. The tool sled of claim 4, further comprising at least one rigid curved stay being attached to the body and extending along the body parallel to the longitudinal axis, wherein the plurality of distinct segments pivot about the plurality of joints to conform to a curvature of the rigid curved stay, wherein the rigid curved stay is attached to the concave top surface and the curvature of the rigid curved stay defines a shape of the concave top surface and the convex bottom surface, wherein the body comprises a leading edge, a trailing edge opposite the leading edge and a pair of opposing side edges extend from the leading edge to the trailing edge, wherein the handle extends from the leading edge, and wherein the rigid curved stay further comprises a pair of identical rigid curved stays where each of the identical rigid curved stays runs along one of the pair of opposing side edges.

9. The tool sled of claim 4, further comprising at least one rigid curved stay being attached to the body and extending along the body parallel to the longitudinal axis, wherein the plurality of distinct segments pivot about the plurality of joints to conform to a curvature of the rigid curved stay, wherein the rigid curved stay is attached to the concave top surface and the curvature of the rigid curved stay defines a shape of the concave top surface and the convex bottom surface, wherein the body comprises a leading edge, a trailing edge opposite the leading edge and a pair of opposing side edges extend from the leading edge to the trailing edge, wherein the handle extends from the leading edge, wherein the rigid curved stay further comprises a pair of identical rigid curved stays where each of the identical rigid curved stays runs along one of the pair of opposing side edges, wherein the body further comprises a pair of leading corners, wherein each of the pair of leading corners defines a point of intersection of one of the opposing side edges and the leading edge, and wherein the leading edge extends outward in a direction of travel of the sled from a leading corner line connects the pair of leading corners.

10. The tool sled of claim 4, further comprising at least one rigid curved stay being attached to the body and extending along the body parallel to the longitudinal axis, wherein the plurality of distinct segments pivot about the plurality of joints to conform to a curvature of the rigid curved stay, wherein the rigid curved stay is attached to the concave top surface and the curvature of the rigid curved stay defines a shape of the concave top surface and the convex bottom surface, wherein the body comprises a leading edge, a trailing edge opposite the leading edge and a pair of opposing side edges extend from the leading edge to the trailing edge, wherein the handle extends from the leading edge, and wherein the rigid curved stay further comprises a pair of identical rigid curved stays where each of the identical rigid curved stays runs along one of the pair of opposing side edges, wherein the body further comprises a pair of leading corners, wherein each of the pair of leading corners defines a point of intersection of one of the opposing side edges and the leading edge, wherein the leading edge extends outward in a direction of travel of the sled from a leading corner line connects the pair of leading corners, wherein the body further comprises a pair of trailing corners, each of the pair of trailing corners define a point of intersection of one of the opposing side edges and the trailing edge, wherein the leading corner line parallel to a trailing corner line connects the pair of trailing corners, wherein the leading corner line and the trailing corner line are disposed in a common plane, and wherein the leading edge extends out of the common plane a predefined distance.

11. The tool sled of claim 4, further comprising at least one rigid curved stay being attached to the body and extending along the body parallel to the longitudinal axis, wherein the plurality of distinct segments pivot about the plurality of joints to conform to a curvature of the rigid curved stay, wherein the rigid curved stay is attached to the concave top surface and the curvature of the rigid curved stay defines a shape of the concave top surface and the convex bottom surface, wherein the body comprises a leading edge, a trailing edge opposite the leading edge and a pair of opposing side edges extend from the leading edge to the trailing edge, wherein the handle extends from the leading edge, wherein the rigid curved stay further comprises a pair of identical rigid curved stays where each of the identical rigid curved stays runs along one of the pair of opposing side edges, wherein the body further comprises a pair of leading corners, wherein each of the pair of leading corners defines a point of intersection of one of the opposing side edges and the leading edge, wherein the leading edge extends outward in a direction of travel of the sled from a leading corner line connects the pair of leading corners, and wherein each rigid curved stay comprises an upper edge disposed in the common plane and extends from the upper edge to the concave top surface along an entire length of one of the opposing side edges.

12. The tool sled of claim 4, further comprising at least one sled runner being attached to the convex bottom surface and extending across at least one of the plurality of the distinct segments.

13. The tool sled of claim 4, further comprising a plurality of sled runners, wherein each of the plurality of sled runners extends across the plurality of the distinct segments parallel to the longitudinal axis.

14. The tool sled of claim 1, wherein a predefined distance is sufficient to locate the rigid handle a distance of at least 6 inches above a support surface in contact with the convex bottom surface of the tool sled.

15. The tool sled of claim 1, wherein the flat plate lies in a flat plate plane parallel to a common plane.

16. The tool sled of claim 1, wherein the first contact line comprises two separate hinges spaced from each other along the first contact line, wherein the flat plate comprises a notch disposed between the two separate hinges and extends into the flat plate from the first contact line, and wherein the notch allows access to a void disposed between the flat plate and the concave top surface.

17. A system for transporting tools comprising:
a tool sled comprising:
a body comprising a concave top surface and a convex bottom surface,
wherein at least a portion of the body is symmetric about a transverse axis, which passes through the body in a direction perpendicular to a direction of movement of the tool sled;
a flat plate contacting with the concave top surface along two distinct contact lines running across the concave top surface, each of the distinct contact line is parallel to the transverse axis;
a rigid handle being attached to the body,
wherein the rigid handle extends upwardly from the concave top surface and outwardly from the body along a longitudinal axis parallel to the direction of movement of the tool sled; and
a propulsion mechanism contacting the rigid handle,
wherein the two distinct contact lines comprise a first contact line and a second contact line, wherein the first contact line comprises at least one hinge in contact with the flat plate and the concave top surface, and wherein the first contact line is configured to facilitate movement of the flat plate from contact with the concave top surface along the second contact line.

18. The system of claim 17, wherein the propulsion mechanism comprises one of an unmanned self-propelled vehicle, a motorized vehicle, a manned vehicle, a robot, a robotic vehicle, an automobile, a motorcycle, a bicycle and a tractor.

19. A tool sled comprising:
a body comprising a concave top surface and a convex bottom surface,
wherein at least a portion of the body is symmetric about a transverse axis, which passes through the body in a direction perpendicular to a direction of movement of the tool sled;
a flat plate contacting with the concave top surface along two distinct contact lines running across the concave top surface, each of the distinct contact line is parallel to the transverse axis; and
a rigid handle being attached to the body,
wherein the rigid handle extends upwardly from the concave top surface and outwardly from the body along a longitudinal axis parallel to the direction of movement of the tool sled,
wherein the two distinct contact lines comprise a first contact line and a second contact line, wherein the first contact line comprises at least one hinge in contact with the flat plate and the concave top surface, and wherein the first contact line is configured to facilitate movement of the flat plate from contact with the concave top surface along the second contact line.

\* \* \* \* \*